United States Patent [19]
Yan

[11] Patent Number: 5,839,546
[45] Date of Patent: Nov. 24, 1998

[54] SAFETY LOCKING DEVICE FOR VEHICLE

[76] Inventor: Jason Yan, No. 118-38, Hsin Chern Road, Taiping City, Taichung Hsien, Taiwan

[21] Appl. No.: 967,921

[22] Filed: Nov. 12, 1997

[51] Int. Cl.⁶ .............................. B62D 39/00; B62C 7/02
[52] U.S. Cl. ............................ 188/69; 188/1.12; 188/19; 280/33.994
[58] Field of Search ........................ 188/1.12, 17, 19–22, 188/31, 68, 69; 280/33.992–33.994; 16/35 R

[56] References Cited

U.S. PATENT DOCUMENTS

| | | | |
|---|---|---|---|
| 2,823,921 | 2/1958 | Lagaard | 188/22 |
| 2,958,537 | 11/1960 | Young | 280/33.994 |
| 2,995,958 | 8/1961 | Jurgeluig et al. | 188/69 |
| 3,002,370 | 10/1961 | La Brie, Jr. | 280/33.994 |
| 3,002,589 | 10/1961 | Cook | 188/69 |
| 3,068,963 | 12/1962 | Smith et al. | 188/69 |
| 3,366,201 | 1/1968 | Pesta | 188/19 |
| 3,623,575 | 11/1971 | Schittigheim | 188/19 |
| 4,416,460 | 11/1983 | Morris | 188/69 |
| 4,953,667 | 9/1990 | Bigo | 188/69 |
| 5,465,986 | 11/1995 | MacRae | 188/19 |
| 5,603,517 | 2/1997 | Lorman | 188/1.12 |
| 5,607,030 | 3/1997 | Surff et al. | 188/1.12 |
| 5,632,360 | 5/1997 | Melana | 188/1.12 |

FOREIGN PATENT DOCUMENTS

| | | | |
|---|---|---|---|
| 1480361 | 5/1967 | France | 280/33.994 |

*Primary Examiner*—Robert J. Oberleitner
*Assistant Examiner*—Chris Schwartz

[57] ABSTRACT

A device for locking a vehicle and for preventing the vehicle from moving down a hill includes a housing secured to the vehicle and a beam rotatably secured in the housing. A casing is secured on top of the beam and a ball is received in the casing and has a tendency to move downward to the bottom of the casing for allowing the ball to maintaining the beam at a position perpendicular to the supporting ground. A ratchet mechanism may stop the wheels of the vehicle when the beam is tilted relative to the housing and when the housing is tilted relative to the supporting ground.

7 Claims, 4 Drawing Sheets

SAFETY LOCKING DEVICE FOR VEHICLE

BACKGROUND OF THE INVENTION

1. Field of the Invention

The present invention relates to a locking device, and more particularly to a safety locking device for a vehicle.

2. Description of the Prior Art

Typical vehicles or moving carts, particularly the push carts, strollers, baby walkers, toy vehicles, and wheel chairs, are provided for babies, children or for handicapped persons. The vehicles may not be locked when the vehicle is tilted or moves downward from a hill or from a ramp, such that the vehicle may still move downward along the ramp and will not be stopped, and such that the weak persons will be easily hurt.

The present invention has arisen to mitigate and/or obviate the afore-described disadvantages of the conventional vehicles.

SUMMARY OF THE INVENTION

The primary objective of the present invention is to provide a safety locking device for automatically locking the vehicle when the vehicle is tilted.

In accordance with one aspect of the invention, there is provided a safety locking device for locking a vehicle and for preventing the vehicle from moving down a hill, the safety locking device comprising a housing for securing to the vehicle, a beam rotatably secured in the housing at a shaft and including an upper portion and a bottom portion, at least one wheel provided below the beam for engaging with a supporting ground, means for maintaining the beam at a position perpendicular to the supporting ground, the beam being tilted relative to the housing when the housing is tilted relative to the supporting ground, and ratchet means for engaging with the wheels and for stopping the wheels when the beam is tilted by the maintaining means. The user or the riders of the vehicle may thus be prevented from being hurt when the vehicle moves downward along the hill inadvertently.

The maintaining means includes a casing secured on the upper portion of the beam and having a bottom recess, a ball received in the casing and having a tendency to move downward toward the bottom recess of the casing for maintaining the casing and the beam at the position perpendicular to the ground. A post is rotatably secured in the housing at a spindle and including a bottom end, the casing is secured on top of the post, the upper portion of the beam includes a cavity for engaging with the bottom end of the post and for allowing the beam to be rotated by the post when the post is tilted relative to the housing.

The at least one wheel is supported in the vehicle at an axle, the ratchet means includes a pair of ratchet wheels secured on the axle and rotated in concert with the axle, and includes a pair of pawls secured to the bottom portion of the beam for engaging with the ratchet wheels and for stopping the at least one wheel when the beam is tilted relative to the housing. A disengaging means may disengage the pawls from the ratchet wheels and include a rod slidably engaged in the housing and a positioner secured to the rod for engaging with the beam and for disengaging the pawls from the ratchet wheels. The rod includes a second end extended outward of the housing for forming a knob and for actuating the positioner to engage with the beam and for disengaging the positioner from the beam.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
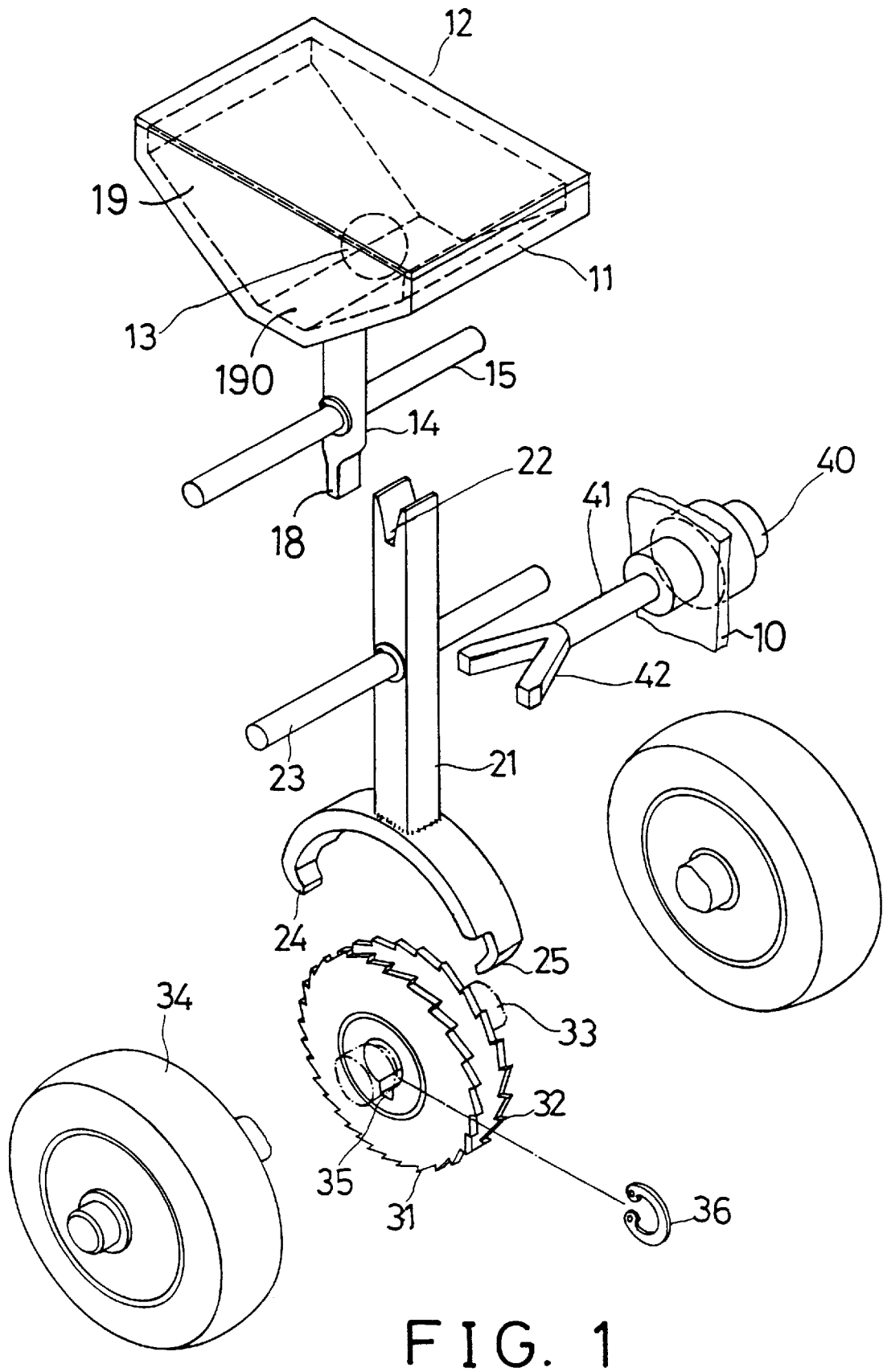
FIG. 1 is an exploded view of a safety locking device in accordance with the present invention.
Figure 2:
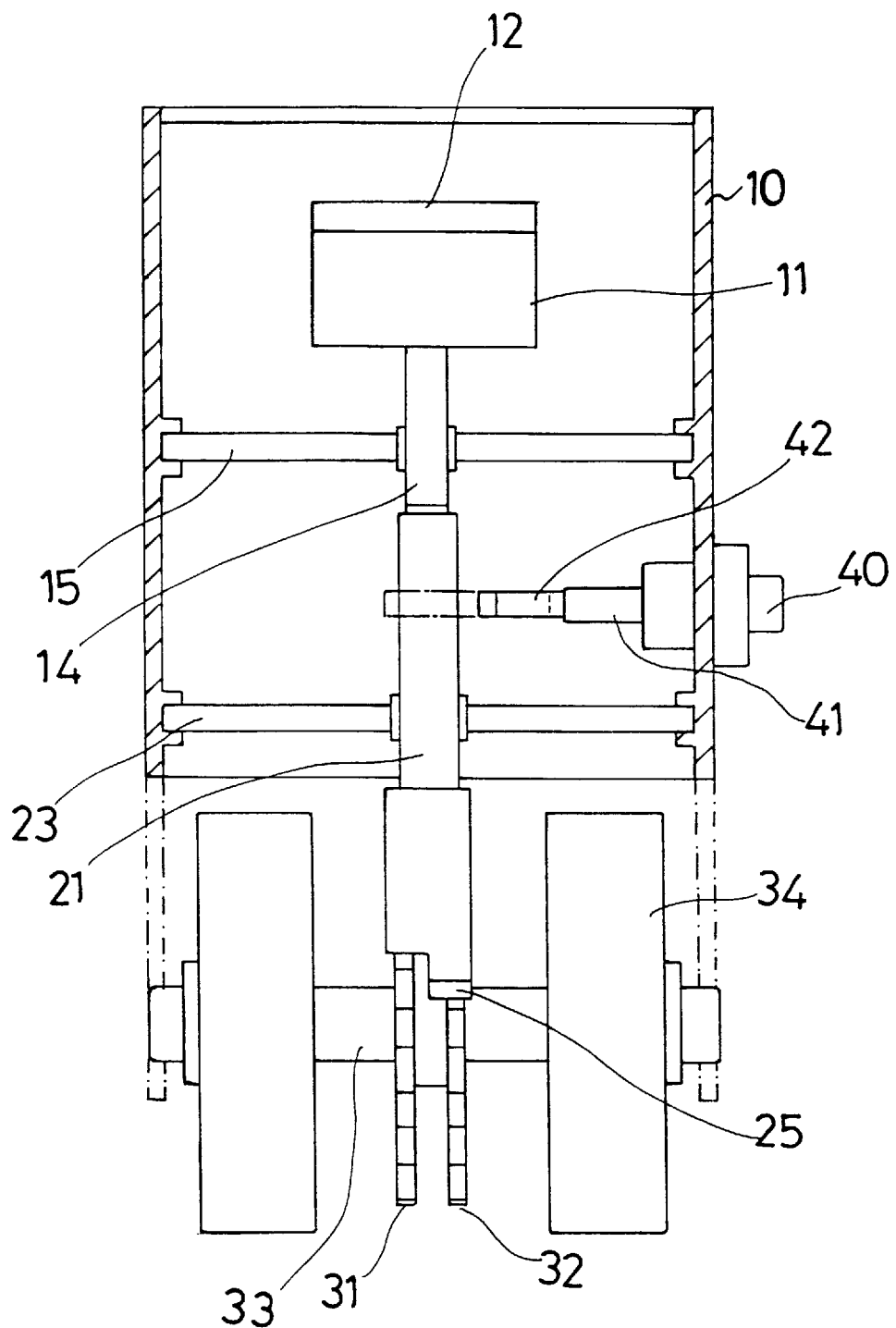
FIG. 2 is a partial cross sectional view of the safety locking device.

Referring to the drawings, and initially to FIGS. 1 and 2, a safety locking device in accordance with the present invention comprises a housing 10 for securing to a vehicle or a moving cart. A post 14 is rotatably secured in the housing 10 at a spindle 15. A casing 11 is secured on top of the post 14 and a cover 12 is secured on top of the casing 11. The casing 11 includes a pair of opposite tapered surfaces 19 for defining a bottom recess 190. A ball 13 is received in the casing 11 and has a tendency to move downward to the bottom recess 190 for maintaining the casing 11 at a horizontal position and for maintaining the post 14 at a position perpendicular to the supporting ground. The post 14 may still be maintained at the position perpendicular to the ground when the housing 10 is tilted relative to the ground, such that the post 14 may rotate relative to the housing 10 about the spindle 15 when the housing 10 or the vehicle is tilted. The post 14 includes a bottom end 18.

A beam 21 is rotatably secured in the housing 10 at a shaft 23 and includes a cavity 22 formed in top for engaging with the bottom end 18 of the post 14. The beam 21 may thus be rotated about the shaft 23 by the post 14 when the housing 10 is tilted relative to the ground. A pair of pawls 24, 25 are secured to the bottom portion of the beam 21. One or more wheels 34 are rotatably secured to the housing 10 at an axle 33. The wheels 34 and the axle 33 may also be secured to the vehicle instead of the housing 10. A pair of ratchet wheels 31, 32 are secured on the axle 33 by such as key element 35 such that the ratchet wheels 31, 32 rotate in concert with the axle 33. The ratchet teeth of the ratchet wheels 31, 32 are arranged in an opposite direction such that the pawls 24, 25 may engage with the ratchet teeth of the ratchet wheels in order to stop the axle 33 and the wheels 34 when the beam 21 is rotated about the shaft 23 by the post 14 and when the housing 10 and the vehicle is tilted.

A rod 41 is slidably engaged in the housing 10 and includes a Y-shaped positioner 42 for engaging with the beam 21 and for maintaining the beam 21 and the pawls 24, 25 in place and for preventing the pawls 24, 25 from engaging with the ratchet wheels 31, 32. The rod 41 has the other end extended outward of the housing 10 for forming a knob 40, or a knob 40 is secured to the other end of the rod 41 for actuating the positioner 42 to engage with the beam 21 or for disengaging the positioner 42 from the beam 21.

In operation, when the housing 10 and the vehicle is tilted relative to the supporting ground or moving downward a ramp, the beam 21 may be rotated by the post 14 such that either of the pawls 24, 25 may be caused to engage with the ratchet wheels 31, 32 in order to stop the wheels 34. The vehicle may thus be stopped and may be prevented from moving downward the ramp or the hill inadvertently.

Figure 3:
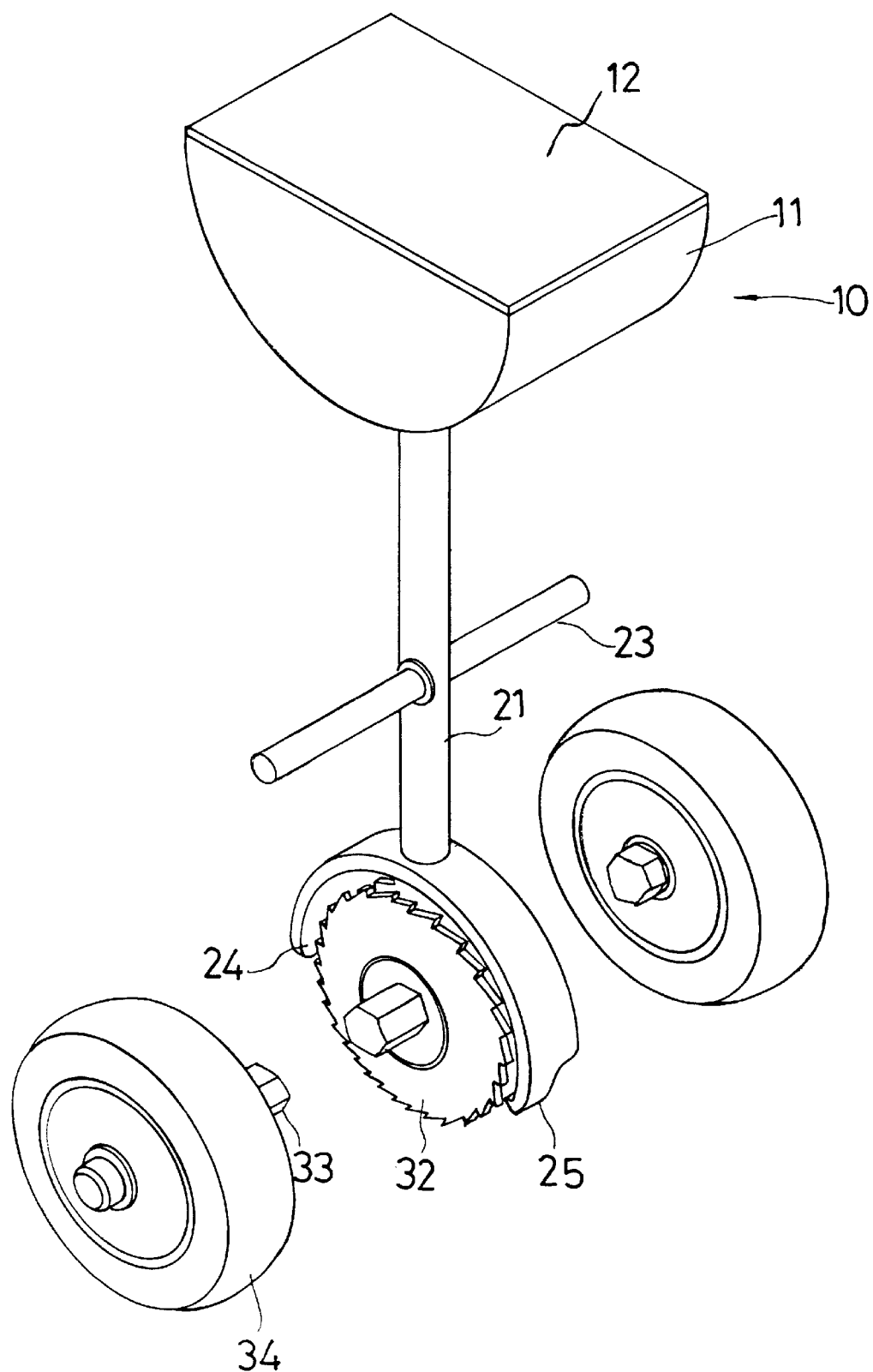
FIG. 3 is an exploded view illustrating another application of the safety locking device.
Figure 4:
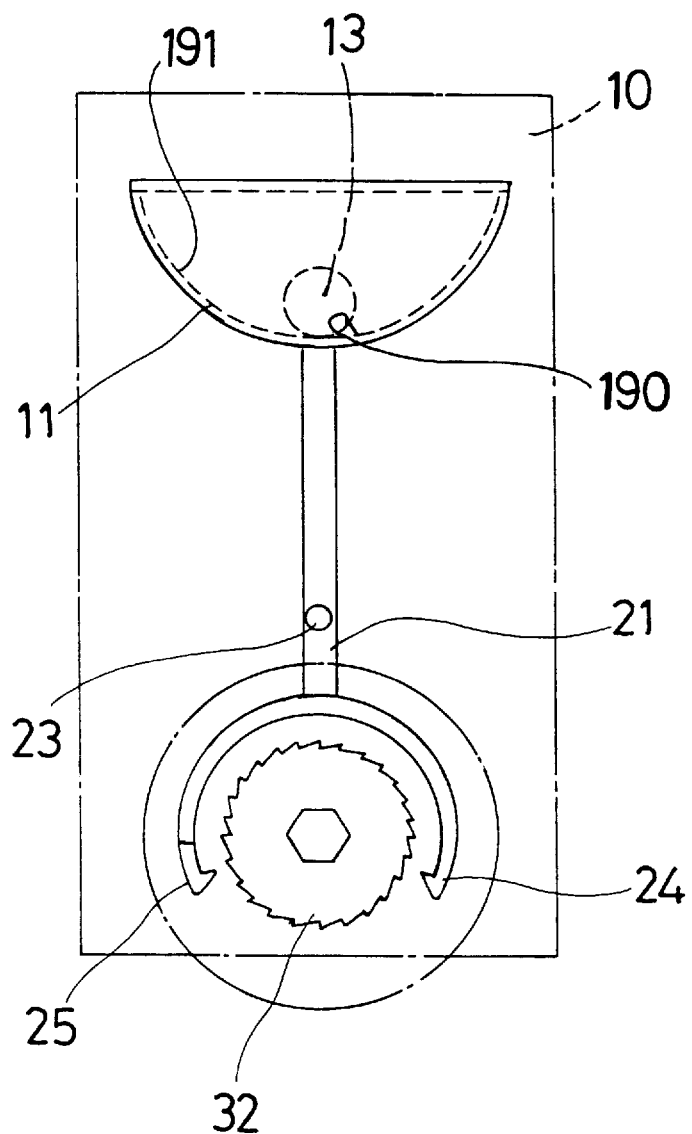
FIG. 4 is a plan schematic view illustrating the operation of the safety locking device as shown in FIG. 3.

Referring next to FIGS. 3 and 4, without the post 14 and the spindle 15, the casing 11 may also be directly secured on top of the beam 21 and may include a curved bottom surface 191 for allowing the ball 13 to move downward to the bottom recess 190.

It is to be noted that the wheels 34 may be the wheels 34 of the vehicle or may be additionally provided for engaging with the supporting ground.

Accordingly, the safety locking device in accordance with the present invention may automatically lock the vehicle when the vehicle is tilted and may thus prevent the user from being hurt.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A safety locking device for locking a vehicle and for preventing the vehicle from moving down a hill, said safety locking device comprising:

a housing for securing to the vehicle, a beam rotatably secured in said housing at a shaft and including an upper portion and a bottom portion, at least one wheel provided below said beam for engaging with a supporting ground, means for maintaining said beam at a position perpendicular to the supporting ground, said beam being tilted relative to said housing when said housing is tilted relative to the supporting ground, and ratchet means for engaging with said wheels and for stopping said wheels when said beam is tilted by said maintaining means.

2. The safety locking device according to claim 1, wherein said maintaining means includes a casing secured on said upper portion of said beam and having a bottom recess, a ball received in said casing and having a tendency to move downward toward said bottom recess of said casing for maintaining said casing and said beam at the position perpendicular to the ground.

3. The safety locking device according to claim 2 further comprising a post rotatably secured in said housing at a spindle and including a bottom end, said casing being secured on top of said post, said upper portion of said beam including a cavity for engaging with said bottom end of said post and for allowing said beam to be rotated by said post when said post is tilted relative to said housing.

4. The safety locking device according to claim 1, wherein said at least one wheel is supported in said vehicle at an axle, said ratchet means includes a pair of ratchet wheels secured on said axle and rotated in concert with said axle, and includes a pair of pawls secured to said bottom portion of said beam for engaging with said ratchet wheels and for stopping said at least one wheel when said beam is tilted relative to said housing.

5. The safety locking device according to claim 4 further comprising means for disengaging said pawls from said ratchet wheels.

6. The safety locking device according to claim 5, wherein said pawls disengaging means includes a rod slidably engaged in said housing and a positioner secured to said rod for engaging with said beam and for disengaging said pawls from said ratchet wheels.

7. The safety locking device according to claim 6, wherein said rod includes a second end extended outward of said housing for forming a knob and for actuating said positioner to engage with said beam and for disengaging said positioner from said beam.

* * * * *